US012056035B2

(12) United States Patent
Lockman, III et al.

(10) Patent No.: US 12,056,035 B2
(45) Date of Patent: Aug. 6, 2024

(54) SYSTEM AND METHOD FOR ENHANCED CONTAINER DEPLOYMENT

(71) Applicant: Dell Products L.P., Round Rock, TX (US)

(72) Inventors: John A. Lockman, III, Granite Shoals, TX (US); Onur Celebioglu, Austin, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 353 days.

(21) Appl. No.: 17/575,344

(22) Filed: Jan. 13, 2022

(65) Prior Publication Data

US 2023/0222045 A1    Jul. 13, 2023

(51) Int. Cl.
*G06F 11/34* (2006.01)
*G06F 9/46* (2006.01)
*G06F 9/50* (2006.01)
*G06F 11/30* (2006.01)
*G06F 8/71* (2018.01)
(Continued)

(52) U.S. Cl.
CPC .......... *G06F 11/3414* (2013.01); *G06F 9/465* (2013.01); *G06F 9/505* (2013.01); *G06F 11/3006* (2013.01); *G06F 11/3433* (2013.01); *G06F 8/71* (2013.01); *H04L 63/14* (2013.01); *H04L 67/1001* (2022.05)

(58) Field of Classification Search
CPC ........ G06F 9/45558; G06F 9/465; G06F 8/71; H04L 63/14; H04L 63/1433; H04L 67/1001
See application file for complete search history.

(56) References Cited

U.S. PATENT DOCUMENTS

| 6,442,564 B1* | 8/2002 | Frey ................. G06F 9/465 |
| 2011/0126275 A1* | 5/2011 | Anderson ............ H04L 63/14 726/8 |

(Continued)

OTHER PUBLICATIONS

Gkikopoulos, Panagiotis & Schiavoni, Valerio & Spillner, Josef. (Jun. 9, 2021). Analysis and Improvement of Heterogeneous Hardware Support in Docker Images. In: Matos M., Greve F. (eds) Distributed Applications and Interoperable Systems. DAIS 2021. Lecture Notes in Computer Science, vol. 12718. Springer, Cham. https://doi.org/10.1007/978-3-030-78198-9_9.

(Continued)

*Primary Examiner* — Barbara B Anyan
(74) *Attorney, Agent, or Firm* — Womble Bond Dickinson (US) LLP

(57) ABSTRACT

Methods and systems for managing the performance of workloads in a distributed system are disclosed. The distributed system may include any number of clients, deployments, and data sources operably to one another. To service the workloads, container instances may be deployed to various deployments. When deciding where to deploy the container instances, the hardware resources of the deployments and/or resource expectations associated with the container instances may be taken into account. By doing so, container instances may be more likely to be deployed to deployments that meet their resource expectations. The resource expectations may be embedded as metadata in resources specific build files.

20 Claims, 13 Drawing Sheets

(51) Int. Cl.
  *H04L 9/40* (2022.01)
  *H04L 67/1001* (2022.01)

(56) References Cited

U.S. PATENT DOCUMENTS

| | | | | |
|---|---|---|---|---|
| 2016/0050294 | A1* | 2/2016 | Kruse | H04L 67/1001 709/201 |
| 2018/0150330 | A1* | 5/2018 | Bernat | H03M 7/3084 |
| 2019/0354403 | A1* | 11/2019 | Ayyagari | G06F 3/061 |
| 2021/0034423 | A1* | 2/2021 | Hallur | G06F 9/45558 |
| 2022/0124009 | A1* | 4/2022 | Metsch | H04L 63/1433 |
| 2022/0317982 | A1* | 10/2022 | Knoulich | G06F 8/71 |

OTHER PUBLICATIONS

"Getting Started with Docker," Web page <https://www.docker.com/get-started>, 1 page, Dec. 31, 2021, retrieved from Internet Archive Wayback Machine <http://web.archive.org/web/20211231094517/https://www.docker.com/get-started> on Jan. 20, 2022.

\* cited by examiner

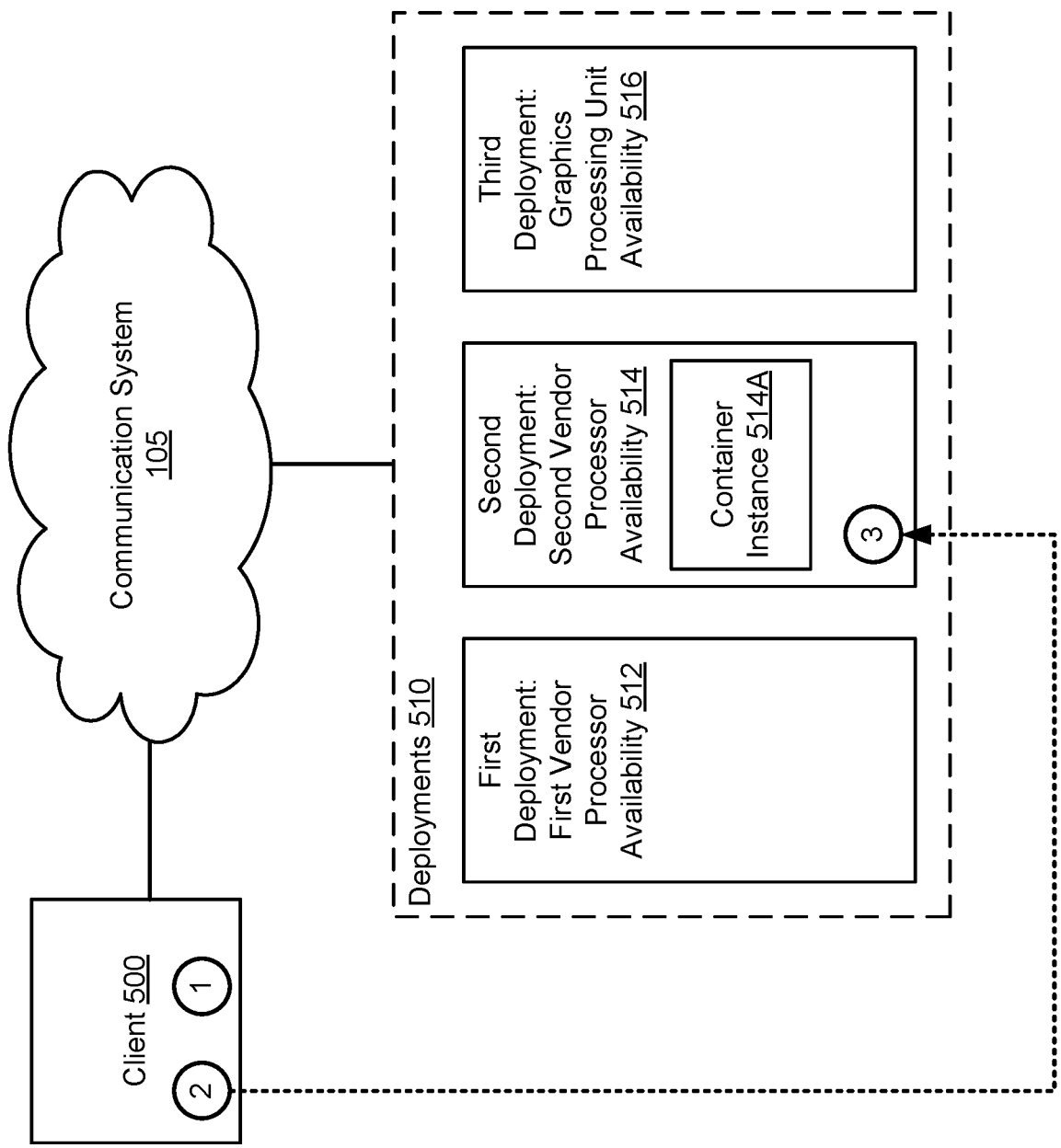

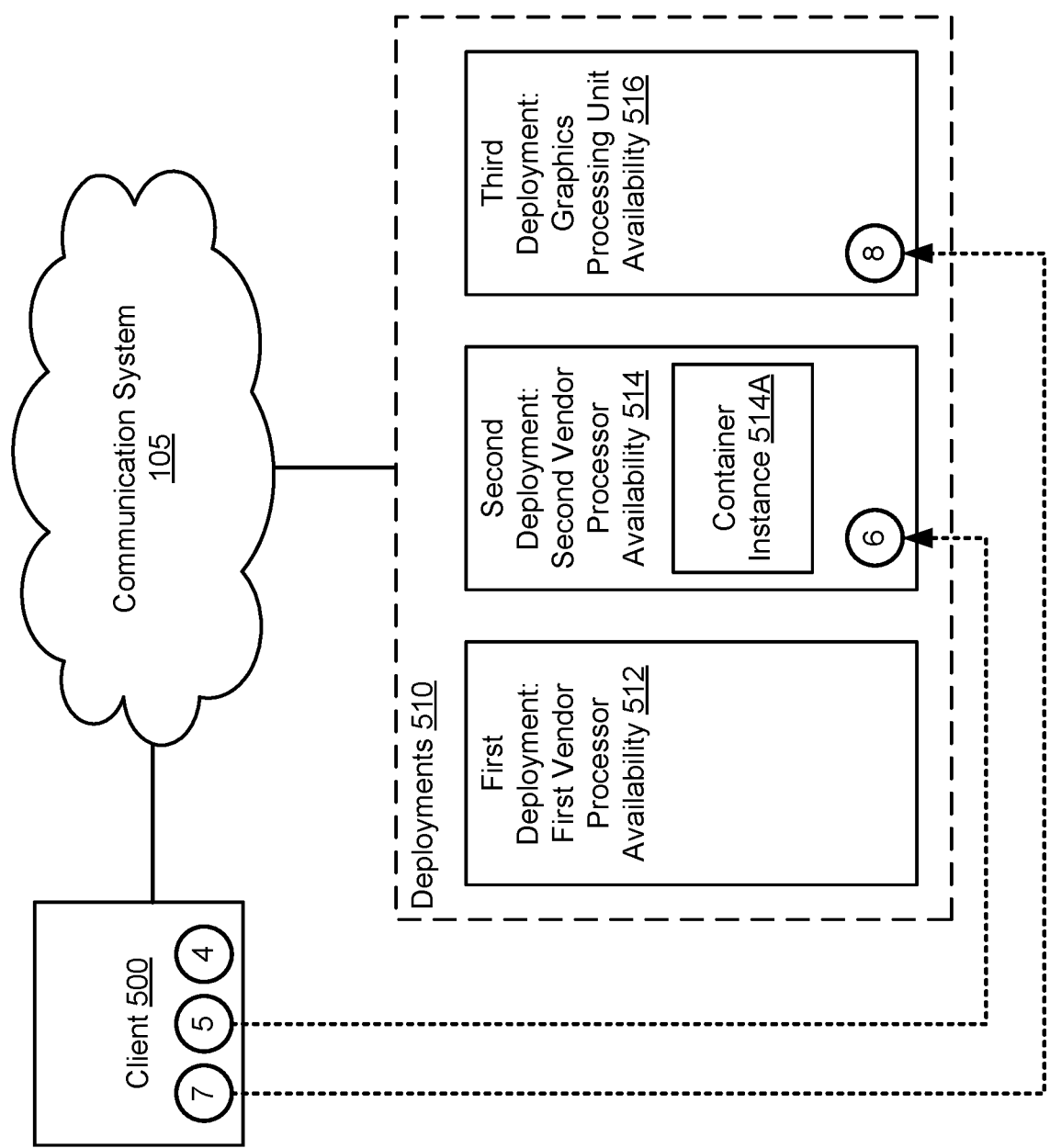

SYSTEM AND METHOD FOR ENHANCED CONTAINER DEPLOYMENT

FIELD OF EMBODIMENTS DISCLOSED HEREIN

Embodiments disclosed herein relate generally to workload management. More particularly, embodiments disclosed herein relate to systems and methods for servicing workload requests using containers.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments are illustrated by way of example and not limitation in the figures of the accompanying drawings in which like references indicate similar elements.

FIGS. 5A-5D show diagrams illustrating example operations performed by an example system over time in accordance with an embodiment.

DETAILED DESCRIPTION

Figure 1:
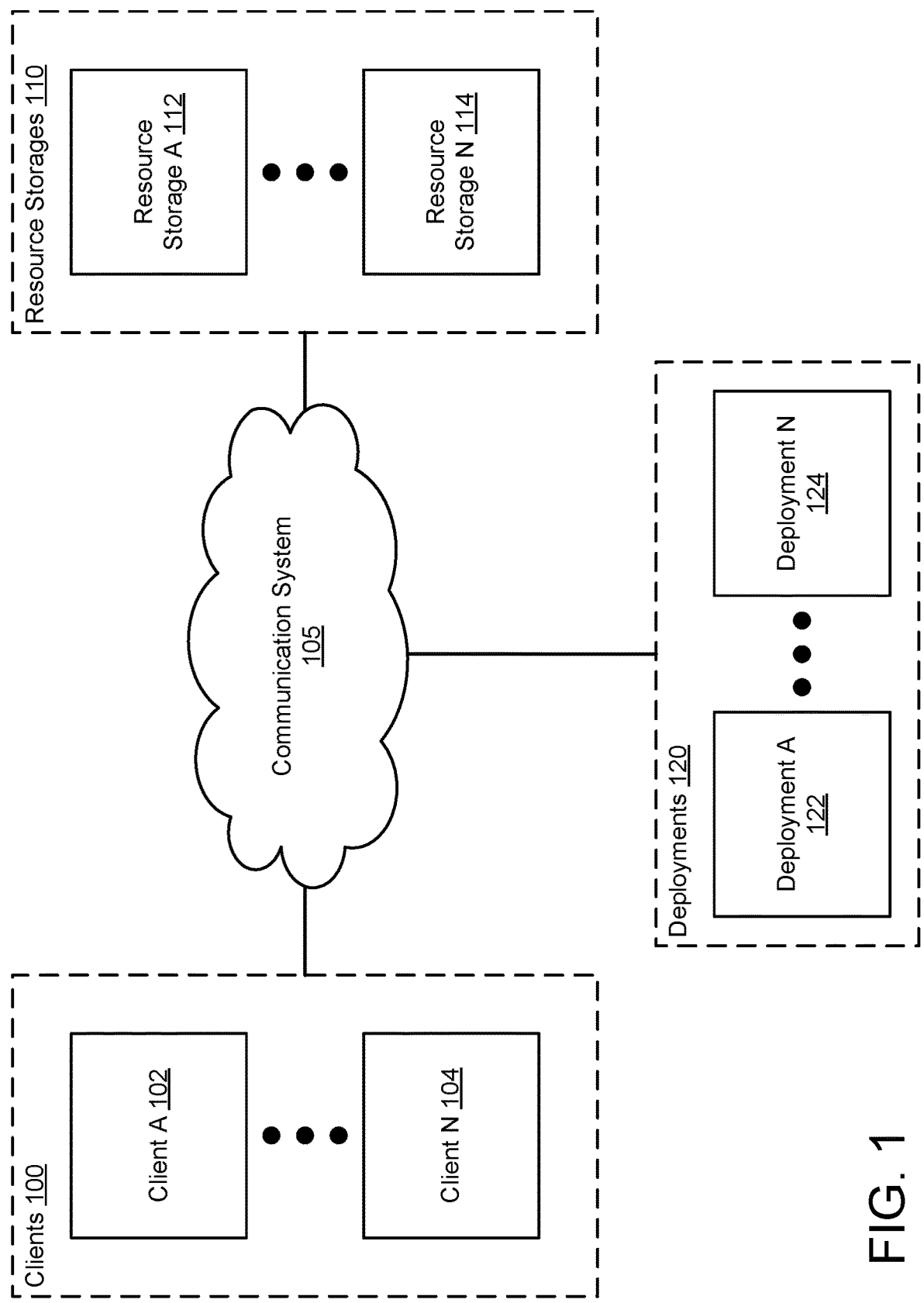
FIG. 1 shows a block diagram illustrating a system in accordance with an embodiment.

Various embodiments and aspects of embodiments disclosed herein will be described with reference to details discussed below, and the accompanying drawings will illustrate the various embodiments. The following description and drawings are illustrative of embodiments disclosed herein and are not to be construed as limiting embodiments disclosed herein. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment of embodiments disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the performance of workloads in a distributed system. The distributed system may include any number of clients, deployments, and data sources operably to one another.

To service the workloads, container instances may be deployed to various deployments. When deciding where to deploy the container instances, the hardware resources of the deployments and/or resource expectations associated with the container instances may be taken into account. By doing so, container instances may be more likely to be deployed to deployments that meet their resource expectations.

To identify the resource expectations of the container instances, metadata embedded in layers of build files corresponding to the container instances may be read. The read metadata may indicate the expected performance of corresponding container instances when hosted by deployments having different types and quantities of hardware resources (e.g., processors, memory modules, storage devices, etc.).

The metadata may be added as build files are created. Once added, the metadata may be used to guide subsequent container deployment decisions. By doing so, repetitive and/or difficult analysis of container images may not need to be performed when making deployment decisions to obtain desired levels of performance.

By doing so, embodiments disclosed herein may provide an improved system that more efficiently marshals limited computing resources. Consequently, additional workloads may be concurrently performed, the workloads may be performed more quickly, and/or other benefits may be obtained.

In an embodiment, a computer-implemented method for managing workloads is provided. The method may include obtaining a new workload request for a workload to be performed with a computing device; identifying a deployment that will perform the workload to service the new workload request; identifying available hardware resources of the deployment for performing the workload; identifying one of a plurality of resource specific build files for the workload, resources expectations of the one of the plurality of resource specific build files most closely matching the available hardware resources; and instantiating a container instance associated with the identified one of the plurality of resource specific build files to perform the workload.

The one of the plurality of resource specific build files may include a first layer; and first metadata that specifies a first portion of the resource expectations, the first portion of the resource expectations being based, at least in part, on a hardware dependency of the first layer.

The one of the plurality of resource specific build files may also include a second layer; and second metadata that specifies a second portion of the resource expectations, the second portion of the resource expectations being based, at least in part, on a hardware dependency of the second layer.

The first layer may define at least one first action usable to obtain a container used to obtain the container instance and the second layer defines at least one second action usable to obtain the container, the second action depending on performance of the first action prior to the second action.

The first metadata may be embedded with the first layer and the second metadata is embedded with the second layer. The one of the plurality of resource specific build files may be implemented as a list comprising entries, the first layer and the first metadata being elements of a first entry of the list, the second layer and the second metadata being elements of a second entry of the list, and ordering of the entries of the list defining dependencies between the first layer and the second layer.

Identifying the one of the plurality of resource specific build files for the workload may include reading embedded metadata from each of the plurality of resource specific build files; obtaining resource expectations for each of the plurality of resource specific build files using the read embedded metadata; and comparing the available hardware resources to each of the resource expectations.

Identifying the one of the plurality of resource specific build files for the workload may include identifying a type of the workload; and performing a lookup using the type of the workload to identify the plurality of resource specific build files, the plurality of resource specific build files being a subset of all resource specific build files, and the subset of the all resource specific build files being discriminable from other subsets on a basis of the type of the workload.

The plurality of resource specific build files for the workload may include metadata enhanced docker files, the metadata enhanced docker files including embedded metadata with each layer of each respective enhanced docker file of the enhanced docker files, the embedded metadata indicating hardware resources which are expected to be present for a corresponding layer.

The hardware resources indicated by the embedded metadata for at least one layer of the enhanced docker files includes a class of a hardware device; a type of a hardware device; and a manufacturer of a hardware device.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, one or more resource storages 110, one or more deployments 120, and a communication system that facilitate operable connections between all, or a portion, of the components illustrated in FIG. 1. Each of these components is discussed below.

All, or a portion, of clients 102-104 may facilitate deployment of workloads thereby causing computer-implemented services to be provided. The computer implemented services may include any type and quantity of services including, for example, database services, instant messaging services, video conferencing services, etc.

To provide these services, one or more of clients 100 may obtain information (e.g., workload requests) regarding workloads to be performed. The information may be obtained, for example, from users of clients 100 or from other devices. Clients 100 may service the workload requests by facilitating deployment of the workloads to one or more of deployments 120.

In an embodiment, the workload requests are serviced by deploying container instances to deployments 120. For example, any of deployments 120 may be adapted to host instances of containers. To do so, the deployments 120 may provide for operating system (OS) level virtualization. Containers (e.g., user space instances) may be hosted and share the services provided by the virtualized operating system. The virtualized operating system may mediate presentation of and access to various resources of the host deployment. The applications and data in each of the hosted containers may be segregated from one another and not be able to interact with one another.

To deploy an instance of a container, a build file may be utilized. The build file may specify any number of actions (e.g., layers) to be performed to obtain an image which may include all of the dependencies, libraries, and/or other data structures necessary for applications and other entities in the image to appropriately execute within a container. The image of the container may be used to deploy an instance of a container. For example, the contents of the image of the container may be stored (e.g., which may be stored in a read-only format) in the user space associated with the container. Additional, some amount of writable space may be available within the container which may be used to facilitate execution of applications, storage of changes to data (e.g., due to application execution) in the container over time, and/or used for other features.

Various resources used to obtain copies of images may be obtained from various entities including, for example, resource storage 110. Resource storage 110 may store copies of any type and quantity of resources. When a build file is used to obtain an image, any number of the resources (e.g., binary executables, dependencies, software libraries, configuration files, etc.) may be obtained and combined to obtain the image. For example, the build file may include any number of actions that when performed cause various resources from resource storage 110 to be obtained. Resource storage 110 may include any number of resource storages (e.g., 112, 114).

Deployments 120 may include any number of data processing devices that may be used to host container instances. As noted above, deployments 120 may host appropriate OS level virtualization services and/or other management entities such that any number of container instances may be deployed to the deployments. Each of the deployments (e.g., 122, 124) may include any number of data processing devices that may independently or cooperatively host container images.

However, any of deployments 120 may include different types and quantities of computing resources (e.g., processing resources, memory resources, persistent storage, communications resources, etc.) provided by hardware devices (e.g., processors, memory modules, storage devices, communications devices, special purpose devices such as graphics processing units, application specific integrated circuits, etc.). Thus, some deployments 120 may be better suited to performing different types of tasks.

Further, different types of container instances obtained using different container images may perform better on a particular deployment by virtue of the dependence of the respective container instances on various types and quantities of hardware resources. Thus, two different containers instances hosted by the same deployment may perform different (e.g., even while performing a similar workload). For example, some container instances may perform better when executed by a particular type of processor and perform poorly when executed by other types of processors. The performance of various container instances may depend on the type and quantity of hardware resources available for performance of the container instances.

However, the dependence of container instances on the hardware available to the container instances may not be readily apparent. Build files, container images, and container instances may each respectively not include information indicating the dependence of corresponding container instances of the hardware resources available for performance. Thus, container instances may operate inefficiently if hosted by deployments that do not have corresponding hardware resources available for the container instances.

In general, embodiments disclosed herein relate to systems, methods, and devices for managing the deployment of workloads using containers instances. To manage the deployment of workloads, the computing resources dependence of container instances may be taken into account when deciding how to service workload requests.

To decide how to service workload requests, various container images may be evaluated to determine their relative levels of performance for a requested workload if deployed to a particular deployment. The container image that is likely to have the best performance may be selected to hosting by the deployment.

To identify the computing resources dependence of container instances, build files corresponding to the container instances may be enhanced (e.g., to obtain resource specific build files). The resource specific build files may directly indicate the computing resource dependence of each layer of the build file. The computing resource dependence of each layer of a container may be aggregated to identify a resource expectation (e.g., the aggregate computing resources that are expected to be present for a corresponding container instance to perform as desired, expected, etc.) for the container instance. The resource expectations of any number of container instances that may be used to perform a workload may be evaluated with respect to a deployment to ascertain which of the container instances will likely provide the best performance.

When a build file is generated, embedded metadata indicating the computing resource dependence of each layer may be added to obtain a resource specific build file. Thus, resource specific build files may need to be compared/analyzed to ascertain which container instance will likely provide the best performance for a particular deployment. In contrast, container instances (and container images) may be large in size and difficult to analyze for computing resource dependence.

By doing so, a system in accordance with embodiments disclosed herein may better marshal limited computing resources for performing workloads. For example, a system in accordance with embodiments disclosed herein may be more likely to utilize higher performance instances of containers thereby providing the system with a higher workload capacity/high workload throughput rate.

Likewise, embodiments disclosed herein may provide an improved build file that provides new and useful utility when compared to unenhanced build files. For example, enhanced build files such as docker files with embedded metadata indicating hardware resource dependence of each layer may be provided. The aforementioned information may provide new degrees of utility for such files and container implementations that have conventionally not taken into account the underlying hardware resources available for execution of container instances. The inclusion of the embedded metadata may improve the operation of a system by improving the efficiency of workload performance. Further, by including embedded metadata at a per-layer-level (e.g., rather than at a macro level for all layers of a build file), the computing resource dependence of each layer may be separately taken into account.

For example, build files may have some layers that will result in portions of container instances that are frequently used while other layers result in portions of container instances that are infrequently used. Thus, when estimating the performance of a container image for a particular location, the relative use rates of each of the layers may also be taken into account by weighting the computing resources indicated by the corresponding embedded metadata of each of the layers when identifying the true resource expectations of each container instance. Consequently, a granulized approach that takes into account both the relative use and computing resources expectations of each layer may be provided.

Any of clients 100, resource storages 110, and deployments 120 may be implemented using a data processing systems (e.g., a computing device) such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding data processing systems, refer to FIG. 7. For additional details regarding clients 100, refer to FIG. 2A.

In an embodiment, communication system 105 includes one or more networks that facilitate communication between all, or a portion, of clients 100, resource storages 110, and deployments 120. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployments 120 may be operably connected to one another via a second local network which is also operably connected to the Internet thereby allowing any of clients 100 and deployments 120 to communication with one another and/or other devices operably connected to the Internet. Clients 100, resource storages 110, deployments 120, and/or communication system 105 may be adapted to perform one or more protocols for communicating via communication system 105.

While illustrated in FIG. 1 as included a limited number of specific components, a system in accordance with an embodiment may include fewer, additional, and/or different components than those illustrated therein.

Figure 2A:
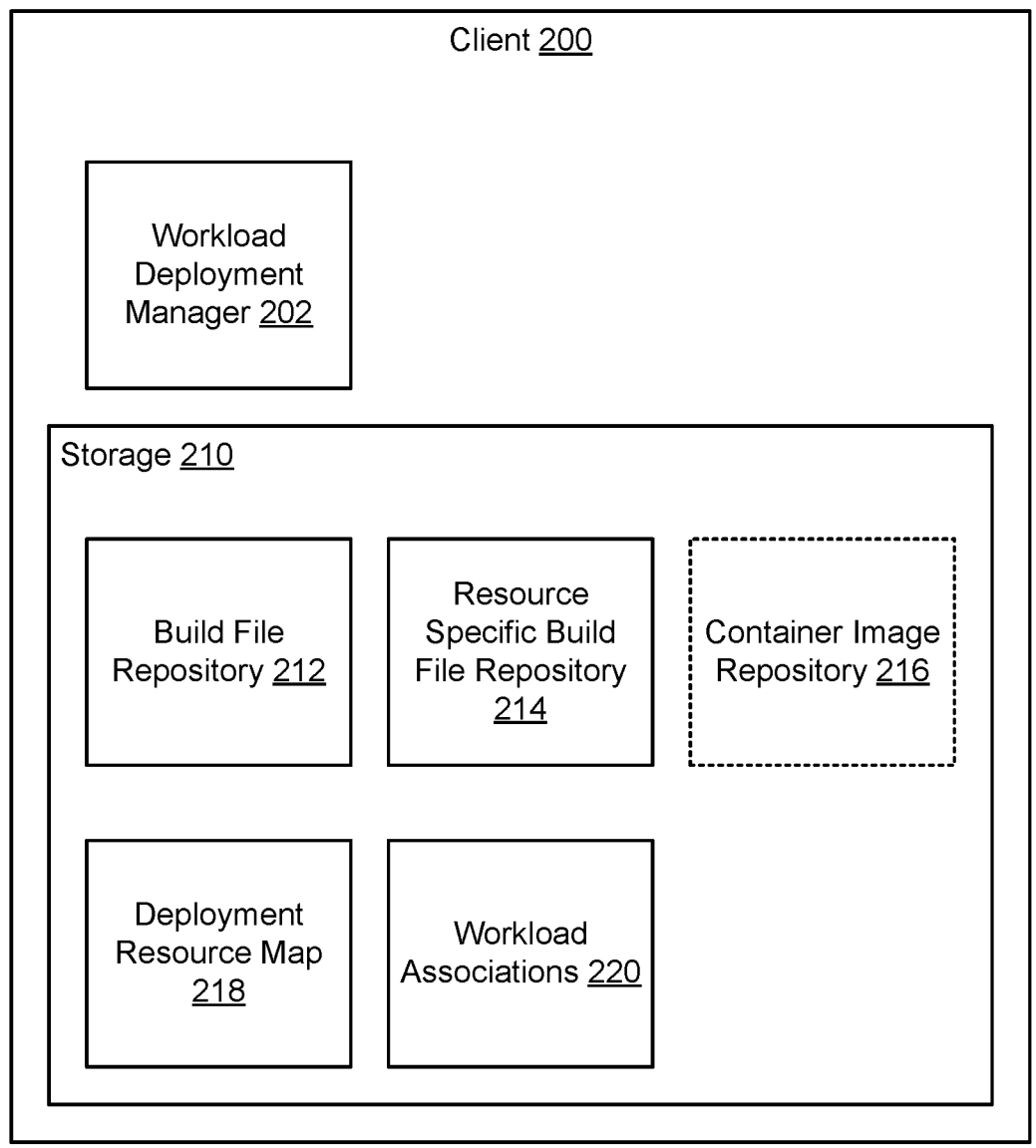
FIG. 2A shows a block diagram illustrating a client in accordance with an embodiment.

Turning to FIG. 2A, a diagram of an example client 200 in accordance with an embodiment is shown. Client 200 may be similar to any of clients 100 shown in FIG. 1. As discussed above, client 200 may facilitate the deployment of workloads based on embedded metadata in build files (e.g., resources specific build files). To provide the aforementioned functionality, client 200 may include workload deployment manager 202 and storage 210. Each of these components is discussed below.

Workload deployment manager 202 may facilitate deployments of workloads. To do so, workload deployment manager 202 may (i) obtain build files (e.g., that do not include embedded metadata), (ii) embed metadata in the build files to obtain resource specific build files, (iii) obtain workload requests, (iv) identify deployment locations for the workloads, (v) identify resource specific workloads that may each be used to perform respective workloads, (vi) for each of the workloads, identify one of the resource specific workloads, and (vii) deploy container instances associated with the identified resource specific build files to the corresponding deployment locations. By doing so, containers instances that may perform better than other types of container instances may be deployed to the deployment locations. Consequently, workloads may be performed more quickly, at higher efficiency, and/or may free limited computing resources for other purposes.

In an embodiment, the build files include docker files. The docker files may include any number of layers. The docker files may be stored in (or referenced by) build file repository 212. The docker files may not include information indicating on which types of hardware corresponding container images may efficiently execute. Consequently, instantiating instances of containers associated with build files without taking into account the underlying hardware resources available for performing the container instances may result in inefficient use of computing resources. Build file repository 212 may include any number of build files and a subset of the build files may be used to perform respective workloads. Each of the build files that may be used to perform the respective workloads may have different levels of performance depending on the available hardware resources.

Figure 2B:
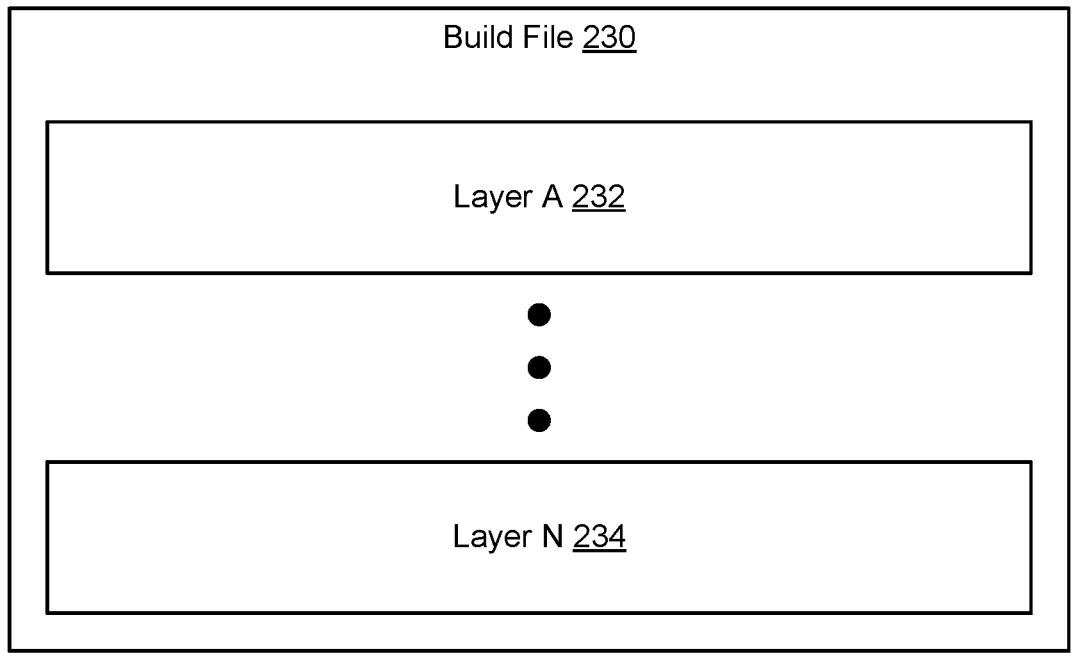
FIG. 2B shows a block diagram illustrating a build file in accordance with an embodiment.
Figure 2C:
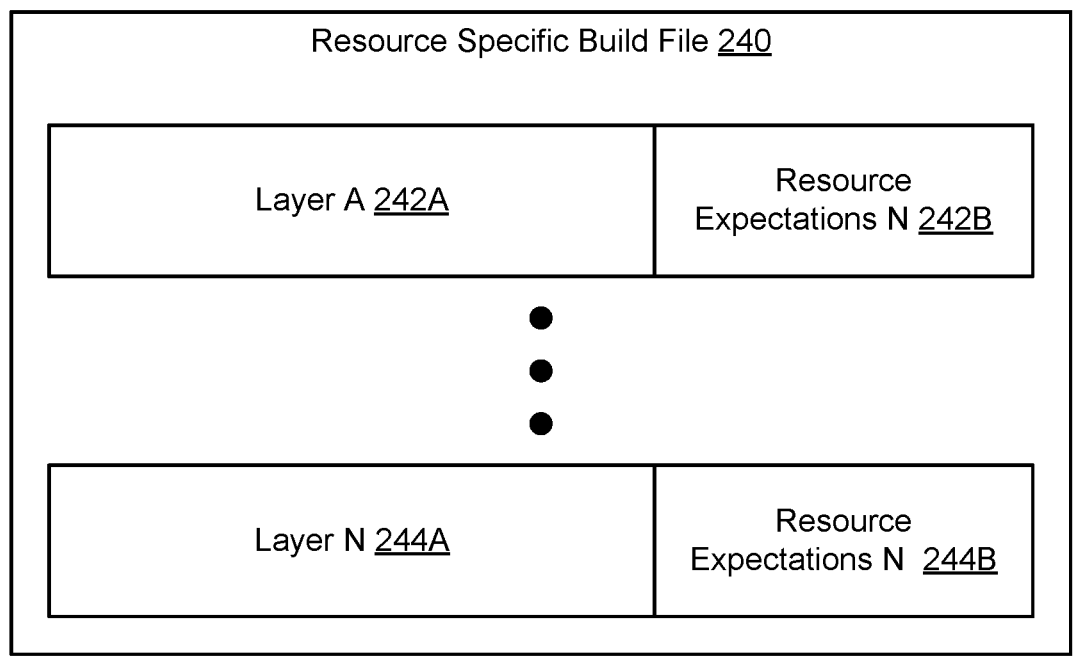
FIG. 2C shows a block diagram illustrating a resource specific build file in accordance with an embodiment.

To facilitate selection of which container images corresponding to the build files to use to instantiate a container image, resource specific build files may be used. The resource specific build files may include embedded metadata indicating how corresponding containers instances are likely to perform when instantiated on deployments with different types of hardware resources. This information may be used by workload deployment manager 202 to select on which container image to base a container instance to be deployed to a particular location. Refer to FIGS. 2B-2C for additional information regarding build files an resource specific build files.

Figure 3:
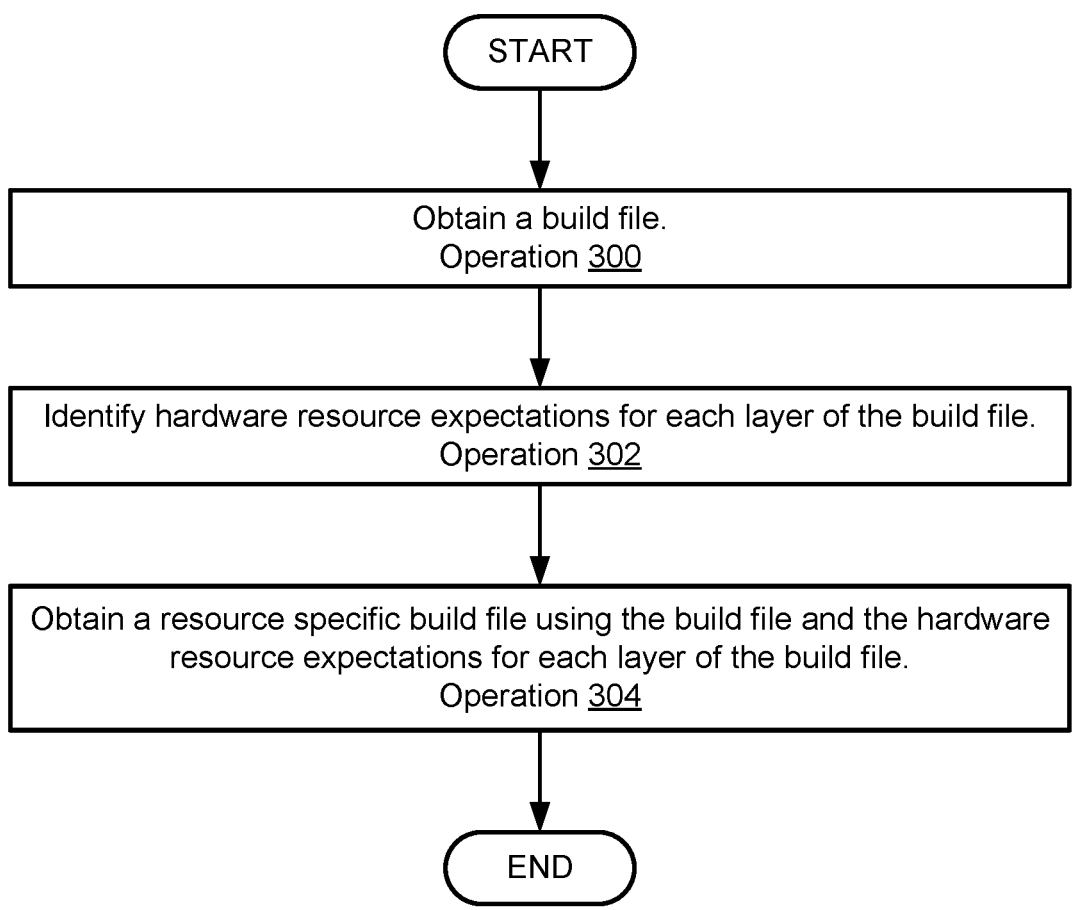
FIG. 3 shows a flow diagram illustrating a method of obtaining a resource specific build file in accordance with an embodiment.
Figure 4:
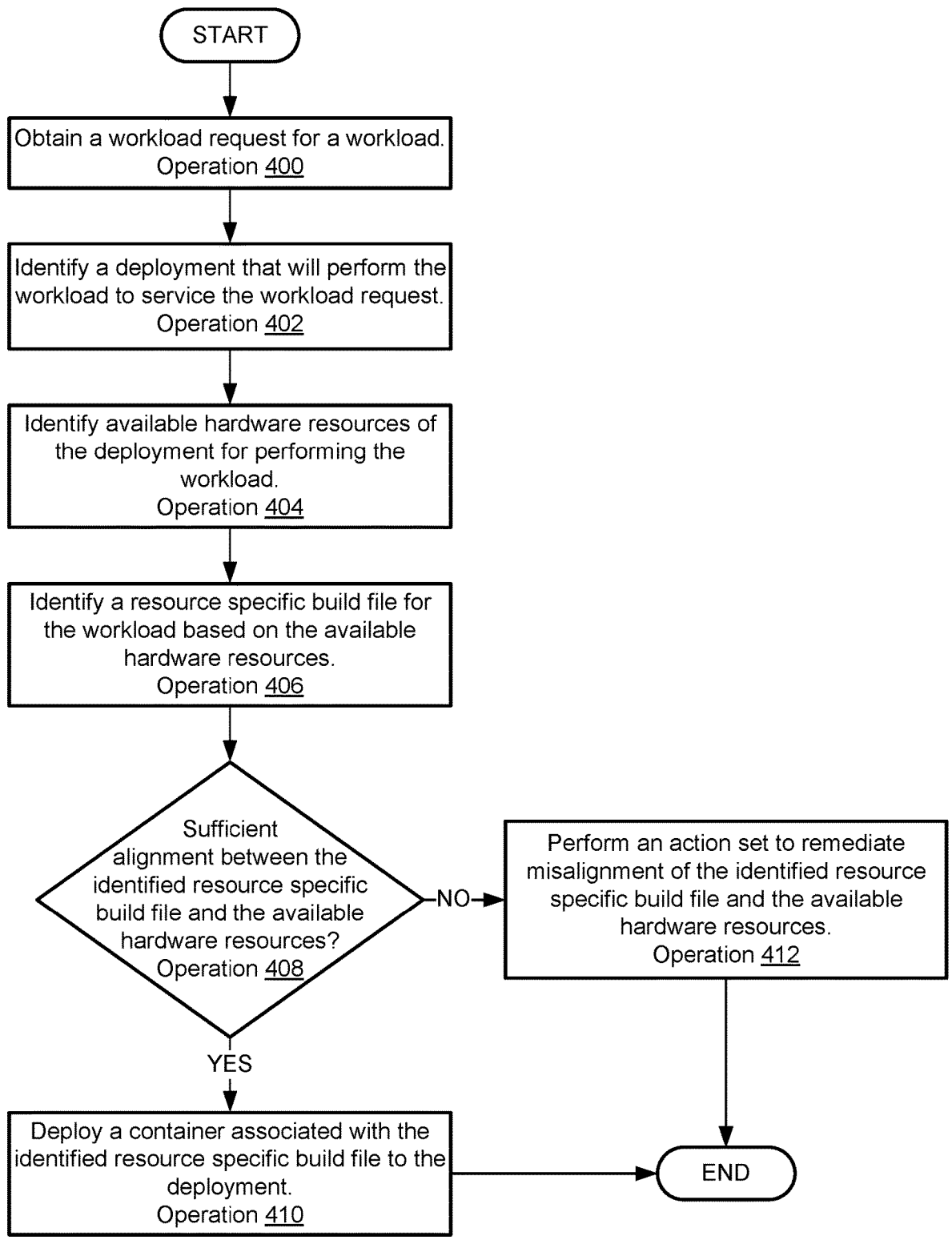
FIG. 4 is a flow diagram illustrating a method of servicing a workload request in accordance with an embodiment.

When providing their functionalities, workload deployment manager 202 may perform all, or a portion, of the methods illustrated in FIGS. 3-4 and/or the operations and actions illustrated in FIGS. 5A-6B.

In an embodiment, workload deployment manager 202 is implemented using a hardware device including circuitry. The hardware device may be, for example, a digital signal processor, a field programmable gate array, or an application specific integrated circuit. The circuitry may be adapted to cause the hardware device to perform the functionality of workload deployment manager 202. Workload deployment manager 202 may be implemented using other types of hardware devices without departing from embodiments disclosed herein.

In one embodiment, workload deployment manager 202 is implemented using a processor adapted to execute computing code stored on a persistent storage that when executed by the processor performs the functionality of workload deployment manager 202 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including build file repository 212, resource specific build file repository 214, container image repository 216 (drawn in FIG. 2A with a dashed outline to emphasize that client 200 may not include container image repository 216, like any other data structure illustrated in FIG. 2A), deployment resource map 218, and workload associations 220. Each of these data structures is discussed below.

Build file repository 212 may include one or more data structures that include information regarding build files. For example, build file repository 212 may include any number of build files (e.g., as separate, discrete files). Each build file may include any number of layers. The build files may be usable to generate container images. A container image may be a data structure that may be (at least partially) loaded in memory and initiated to execute (e.g., as a container instance). The container images may use a virtualized operating system on a host system to facilitate its execution. For example, a container instance may include a container engine, system libraries, any number of utility, configuration settings, and specific applications that may perform corresponding workloads. The container instance may not include an operating system (e.g., it may utilize the virtualized operating system presented to it by an abstraction layer hosted by a host system that present the virtualized operating system to any number of container instances). The build files may also specify the addition of a read/writable space for container images (e.g., while the other layers of the container instances may be immutable). The read/writable space may facilitate operation of the immutable layers by allowing for data to be stored, changes to be recorded, etc.

Resource specific build file repository 214 may include one or more data structures that include information regarding resource specific build files. For example, resource specific build file repository 214 may include any number of build files (e.g., as separate, discrete files) that include embedded metadata which specifies hardware dependencies (and/or requirements which may result in a corresponding container instance not properly working if the requirements are not met), preferences, performance levels of the corresponding layers on various types of hardware, and/or other types of information (e.g., collectively referred to as "resource expectations") which may be used to ascertain how a corresponding container instance may perform when deployed to a particular location. Each build file may include any number of layers. The embedded metadata may be correlated with the layers of each build file.

In an embodiment, the embedded metadata is added as build files are created. For example, when a build file is created and a corresponding container image is generated, the corresponding container image (and layers thereof) may be analyzed to identify its resource expectations. Metadata for the corresponding layers may be generated and added to the build files to obtain resource specific build files (e.g., build files that indicate their resource expectations). The analysis may be performed via any method such as, for example, heuristic analysis, hand analysis (e.g., a person may identify the resources preferences for each layer), automated scoring (e.g., by running corresponding container instances on different deployments with different hardware resource profiles) for different hardware resource conditions, performing lookups using third party data sources (e.g., some build files may be build on top of existing build files provided by specific hardware vendors, the provider of the based build files may be presumed to have optimized the build files for the third party's hardware), etc.

In an embodiment, the embedded metadata includes authentication data which may be used by client 200 to determine whether to trust or otherwise utilize the resources specific build files, or layers thereof. For example, the authentication data may be used by client 200 to ascertain whether a trusted entity generated the resource specific build file, build file on which the resource specific build file is based, or portion thereof.

Container image repository 216 may include one or more data structures that include information regarding container images corresponding to the build files which build file repository 212 and/or resource specific build file repository 214. For example, container image repository 216 may include copies of container images corresponding to the build files of build file repository 212 and/or resource specific build file repository. Other entities may host copies of all, or a portion, of container image repository 216. For example, deployments may host copies of all, or a portion, of container image repository 216.

While build file repository 212m resource specific build file repository 214, and container image repository 216 have been described as including build files or container images, any of these repositories may include, in part or entirely, reference information for various build files and/or container images. For example, the reference information may be usable to download the build files from other entities.

Deployment resource map 218 may include one or more data structures that include information regarding deployments to which workloads may be deployed. For example, deployment resource map 218 may indicate (i) the total hardware resources (regardless of whether in use), (ii) the available hardware resources available, and/or (iii) the unavailable hardware resources of each deployment to which a workload may be deployed. The deployment map may be utilized to select which container image to use to generate a container instance to perform a workload.

Workload associations 220 may include one or more data structures that include information regarding which container images (and/or build files/resource specific build files) are associated with corresponding workloads. For example, different build files and container images may be used to instantiate different types of container instances, each of which may be able to perform a corresponding workload. Workload associations 220 may be used when deciding how to service a workload request. For example, workload associations 220 may be used to identify the range of container instances that each may be performed to service the workload requests. Once identified, one of the range of the container instances may be selected using the deployment resource map and resource specific build file repository 214 (e.g., by identifying which of the range of container instances is best suited to execute using the hardware resources of a deployment to which a container instance will be deployed to service the workload request).

While various data structures have been illustrated and described in FIG. 2A with specific structures, any of the data structures may be implemented with various types of structures (e.g., lists, tables, linked lists, databases, etc.), stored in different locations, may include different/less/more information than described above, and/or spanned across any number of devices without departing from embodiments disclosed herein.

While illustrated in FIG. 2A with a limited number of specific components, a client may include additional, fewer, and/or different components without departing from embodiments disclosed herein.

As discussed above, build files may be enhanced with embedded metadata to obtain resource specific build files. FIGS. 2B-2C show examples of such build files.

Turning to FIG. 2B, an example build file 230 in accordance with an embodiment is shown. Build file 230 may not include embedded metadata. Consequently, it may be different to identify how a container instance based on build file 230 will perform when executed by any particular data processing device. For example, build file 230 may include any number of layers 232, 234 that each specify actions to be performed to obtain a container image corresponding to build file 230. The actions may include, for example, adding various types of information to a data structure. The information may be obtained from a range of locations that may be local (e.g., stored in a local storage device) or may be stored remotely (e.g., in a resource storage 112, 114). For example, the information may include executable files, configurations, and/or other types of information that may be combined to obtain a container image.

Any of layers 232, 234 may have some degree of hardware dependence. The aggregate hardware dependence of layers 232, 234 may be the resource expectations for the build file 230. However, as seen in FIG. 2B, build file 230, and layers 232, 234 thereof, may not include information usable to identify the resource expectations for build file 230. Consequently, the performance of a container image based on build file 230 may not be apparent from build file 230.

Turning to FIG. 2C, an example resource specific build file 240 (e.g., also referred to as a metadata enhanced docker file) in accordance with an embodiment is shown. Resource specific build file 240 may be similar to build file 230 (e.g., it may include any number of similar layers 242A, 244A). However, resource specific build file 240 may include any quantity of embedded metadata (e.g., 242B, 244B). The embedded metadata may specify resource expectations 242B, 244B for each of layers 242A, 244A. Consequently, the likely performance of a container image based on build file 230 may be apparent from resource specific build file 240.

In an embodiment, when a layer has a resource expectation, the resource expectations 242B, 244B indicate a class of a hardware device (e.g., a model); a type of a hardware device (processor, memory device); and/or a manufacturer of a hardware device. For example, resource expectations 242B, 244B may include one or more identifiers corresponding to the class, type, and/or manufacturer.

While layers 232, 234 and layers 242A, 244A are illustrated as having different widths in FIGS. 2B, 2C, these layer may be identical (e.g., include the same information). Additionally, while resource expectations 242B, 244B are illustrated as being interleaved with layers 242A, 244A, layers 242A, 244A and resource expectations 242B, 244B may be arranged differently (e.g., segregated from each other) without departing from embodiments disclosed herein.

However, in an embodiment, resource expectations 242B, 244B are interleaved with layers 242A, 244A to indicate correspondence between the layers and resource expectations. Thus, additional metadata defining correspondence between the layers and resource expectations may not need to be utilized thereby reducing the size of resource specific build files.

A client may include or utilize any number of build files as illustrated in FIGS. 2B-2C.

Figure 2D:
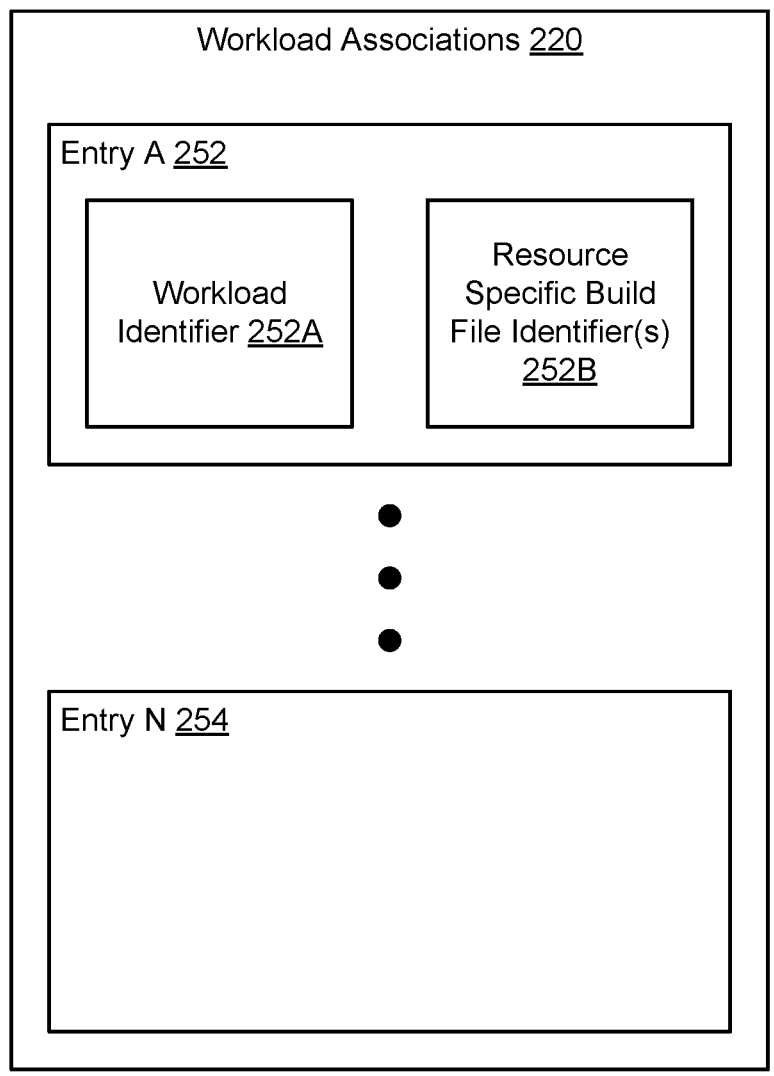
FIG. 2D shows a block diagram illustrating workload associations in accordance with an embodiment.

To identify ranges of build files that may be utilized to service a workload, workload associations may be utilized. Turning to FIG. 2D, an example of workload associations 220 in accordance with an embodiment is shown.

Workload associations 220 may be implemented with a list or other type of data structure that includes any number of entries 252, 254. Each entry may include a workload identifier 252A and corresponding resource specific build file identifiers. When a workload request is obtained, an identifier of the workload that will be performed to service the workload request may be matched to one of entries 252, 254 (e.g., matched against the workload identifier of each entry). One of the resource specific build files identified by the resource specific build file identifiers 252B of the matched entry may be used to instantiate a container instance to service the workload request. The specific resource specific build file (e.g., or associated container image) used to obtain the container instance may be selected from the identified resource specific build files based on the resource expectations of the respective resource specific build files.

While various data structures have been illustrated and described in FIGS. 2B-2D with specific structures, any of the data structures may be implemented with different structures (e.g., lists, tables, linked lists, databases, etc.), stored in different locations, may include less/additional/different information than that discussed herein, and/or spanned across any number of devices without departing from embodiments disclosed herein.

As discussed above, the components of FIG. 1 may perform various methods to service workload performance requests. FIGS. 3-4 illustrates examples of methods that may be performed by the components of FIG. 1. In the diagrams discussed below and shown in FIGS. 3-4, any of the operations may be repeated, performed in different orders, and/or performed in parallel with or a partially overlapping in time manner with other operations.

Turning to FIG. 3, a flow diagram illustrating a method of obtaining a resource specific build file in accordance with an embodiment is shown. The method may be performed by a client or another entity.

At operation 300, a build file is obtained. The build file may be obtained by reading it from another device or location, by receiving input from a user that generates the build file, or via another method.

In an embodiment, the build files is obtained via an application such as a build file editor. A user of a client may utilize the build file editor to generate the build file. For example, the user may add actions to various layers of the build file to obtain the build file.

At operation 302, hardware resource expectations for each layer of the build file are obtained. The hardware resource expectations may be layer-level resource expectations. The hardware resource expectations may specify hardware resource dependence of the layer (e.g., resources that must be present for the layer to operate), performance levels of the layer on different types of hardware resources, hardware preferences, and/or other information which may be used to estimate how well a layer of a build file will perform when a corresponding container instance is instantiated on a particular data processing device.

In an embodiment, the hardware resource expectations are identified by receiving input from the user. For example, the user may input the hardware resource expectations through the build file editor.

In an embodiment, the hardware resource expectations are identified using heuristically obtained information. For example, different types of layers may have known hardware resource expectations.

In an embodiment, the hardware resource expectations are identified from other build files. For example, similar layers in other build files may be matched to each respective layer in the build file. The matched layers in the other build files may already specify corresponding hardware resource expectations.

In an embodiment, the hardware resource expectations are identified using automated computational analysis. For example, different instances of a container based on the build file may be deployed to data processing devices having different hardware resources (e.g., profiles). The performance of the container instances on the respective data processing devices may be quantified as the hardware resource expectations (e.g., the hardware resources of the data processing system on which the container instances best performed may be used as the hardware resources expectations).

The hardware resource expectations may be identified via other methods without departing from embodiments disclosed herein.

At operation 304, a resource specific build file is obtained using the build file and the hardware resource expectations for each layer of the build file. To obtain the resource specific build file, the build file (or a copy thereof) may be subjected to metadata embedding. The metadata may be embedded at a layer level and may specify the hardware resource expectations of each respective layer.

For example, consider an example build file that includes three layers. Through the identification of operation 302, it may be determined that layer 1 includes a dependence on a particular type of processor and that layer three includes a dependence on a particular graphics processing unit. In such a scenario, an identifier of the particular type of processor may be embedded as metadata with the first layer and an identifier of the particular type of graphics processing unit may be embedded as metadata with the third layer. No identifier may be embedded as metadata with the second layer to indicate that the second layer does not include any hardware resource preferences. In this example scenario, the resource specific build file may have a resource expectations of the particular type of processor and the particular type of graphics processing unit.

The method may end following operation 304.

Turning to FIG. 4, a flow diagram illustrating a method of servicing a workload request in accordance with an embodiment is shown. The method may be performed by a client or another entity.

At operation 400, a workload request for a workload is obtained. The workload request may be obtained, for example, from another device via a message (or other type of communication), from a user of the client (e.g., through a workload deployment interface), or via another method. The workload request may specify, for example, the type of the workload to be performed (e.g., via an identifier) and a location (e.g., a data processing device identified with an identifier) at which the workload is to be performed.

At operation 402, a deployment that will perform the workload to service the workload request is identified. The deployment may be identified, for example, via an identifier included in the workload request, by a selection processes used to distribute workloads across deployments, or via another method.

At operation 404, available hardware resources of the deployment for performing the workload are identified. The available hardware resources may be identified, for example, using information included in a deployment resource map (e.g., 218), by requesting them from the deployment (e.g., via a message and the available hardware resources may be specified in a responsive message), or via other methods.

At operation 406, a resource specific build file for the workload is identified based on the available hardware resources. The resource specific build file may be identified by (i) identifying a range of build files (e.g., resource specific build files) that may each be used to service the workload request (e.g., by instantiating a container instance based on a build file) and (ii) selecting one of the range of the build files. The range of build files may be identified using workload associations (e.g., 220) which may specify or otherwise indicate the resources specific build files that may be used to satisfy a workload request based on the type of the workload implicated by the workload request.

Once the range of resource specific build files is identified, one of them may be selected by comparing the resource expectations of the resources specific build files to the hardware resources of the identified deployment that will perform the workload. The resource specific build file having resource expectations that best matches the hardware resources of the identified deployment may be the identified resource specific build file.

At operation 408, it may be determined whether the identified resource specific build file and the available hardware resources are sufficiently aligned. For example, it may be the case that the identified deployment may not include sufficient hardware resources to meet all of the resource expectations of any of the identified resources specific build files that may be used to service the workload.

To make the determination, the differences between the resource expectations of the identified resources specific build file and the hardware resources of the identified deployment may be analyzed to ascertain whether any critical deficiencies are present. A critical deficiency may be a lack of a hardware resource that greatly reduces the performance of a container instance based on the identified resources specific build file. For example, lack of a graphics processing unit or other type of special purposes hardware device indicated by resource expectations of the identified resource specific build file may be treated as a critical deficiency. If a critical deficiency is present, then it may be determined that the identified resource specific build file lacks sufficient alignment. Otherwise, the identified resources specific build may have sufficient alignment even though it does not meet all of the resource expectations of the identified resource specific build file.

If it is determined that the identified resource specific build file lacks sufficient alignment with the available hardware resources of the identified deployment, then the method may proceed to operation 412 following operation 408. Otherwise, the method may proceed to operation 410 following operation 408.

At operation 410, a container associated with the identified resource specific build file is deployed to the container. For example, an instance of the container image associated with the identified resource specific build file may be instantiated at the identified deployment. The resulting container instance may provide computer implemented services that service the workload request.

The method may end following operation 410.

Returning to operation 408, the method may proceed to operation 412 following operation 408 when it is determined that the identified resource specific build file lacks sufficient alignment with the available hardware resources of the identified deployment.

At operation 412, an action set to remediate the misalignment of the identified resource specific build file and the available hardware resources is performed. The action set may include any number of actions. The actions may include one or more of: (i) notifying an administrator and/or requesting entity that the workload is unable to be serviced, (ii) instantiating the container instance on a different deployment, (iii) instantiating a different type of container instance based on a different resource specific build file to service the workload request, and/or (iv) performing other actions.

The method may end following operation 412.

Using the methods illustrated in FIGS. 3-4, embodiments disclosed herein may facilitate deployment of container instances better matched to computing environment in which they will execute. By doing so, the resulting performance of the container instances may be improved thereby allowing for larger numbers of workloads to be serviced. Consequently, embodiments disclosed herein may provide an improved data processing system that more efficiently allocates resources for servicing workloads.

To further clarify embodiments disclosed herein, FIGS. 5A-5D show diagrams in accordance with an embodiment disclosed herein illustrating example operation of a system similar to that shown in FIG. 1 over time. FIGS. 6A-6B illustrate diagrams in accordance with an embodiment disclosed herein of examples of data structures that may be utilized by components of the system illustrated in FIGS. 5A-5D.

Figure 5A:
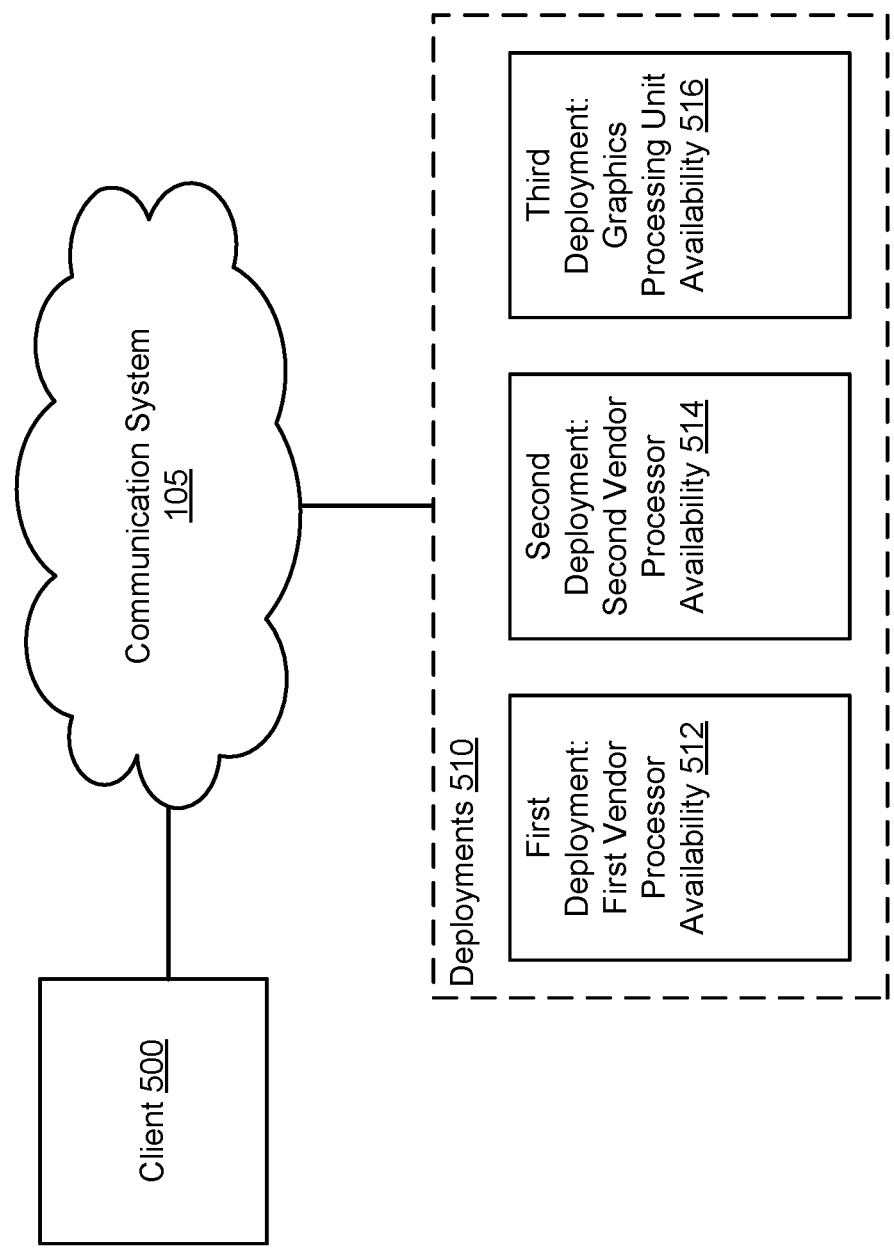
Figure 6A:
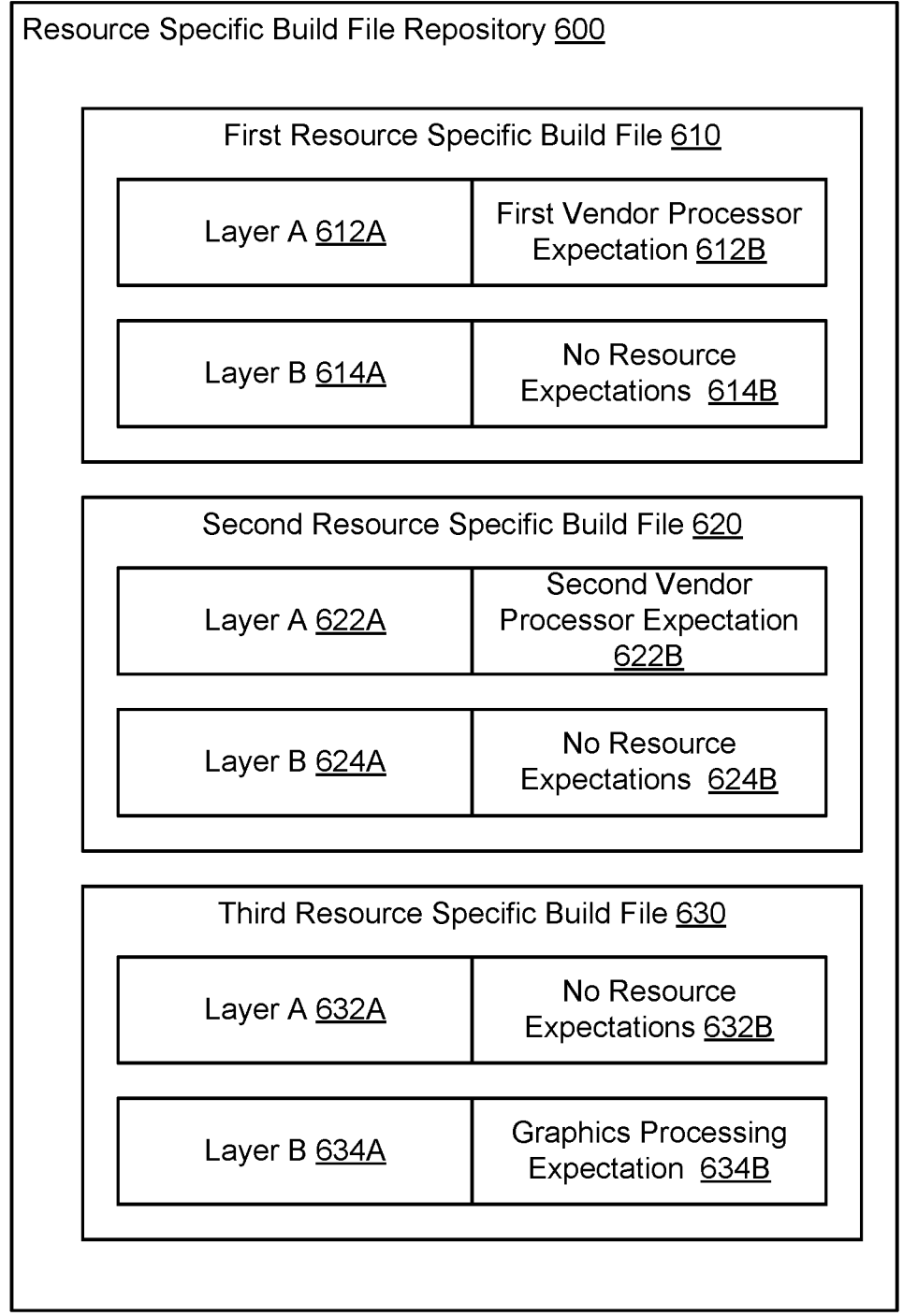
FIGS. 6A-6B show diagrams illustrating example data structures used by an example system in accordance with an embodiment.
Figure 6B:
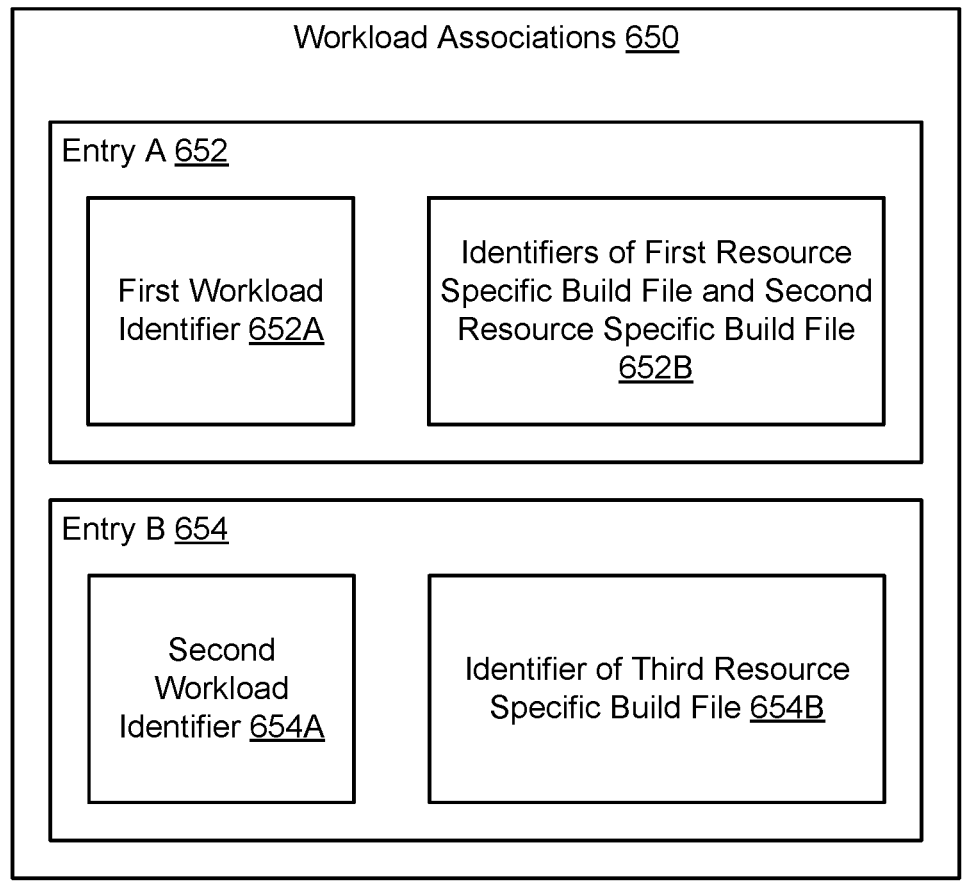

Turning to FIG. 5A, consider an example scenario where client 500 is operably connected to deployments 510 via communication system 105. First deployment 512 may include a first vendor processor, second deployment 512 may include a second vendor processor, and third deployment 516 may include a graphics processing unit thereby resulting in these three deployments having different hardware resource availabilities for performing workloads.

Turning to FIG. 6A, client 500 may host a resource specific build file repository 600 that includes three resource specific build files 610, 620, 630. These resource specific build files may include two layers. The layers 612A, 614B of first resource specific build file 610 may include a first vendor processor resource expectation 612B. The layers 622A, 624A of second resource specific build file 620 may include a second vendor processor resource expectation 622B. The layers 632A, 634A of third resource specific build file 630 may include a graphics processing expectation 634B. Thus each build file may be better suited for hosting by different deployments that host different types of hardware resources.

Turning to FIG. 6B, client 500 may host workload associations 650 that includes two entries 652, 654. Entry A 652 may include first workload identifier 652A and identifiers of first resource specific build file and second resource specific build file 652B. Entry B 654 may include second workload identifier 654A and identifier of third resource specific build file 654B. Thus, different workloads may be services using different resource specific build files while some workloads (e.g., the first workload) may be serviced with multiple resource specific build files.

Returning to FIGS. 5B-5D, actions performed by various components of the system are illustrated. Operations performed by components are illustrated using numbered circles and interactions between components (e.g., data/information transmission) are illustrated using arrows with dashed tails.

Turning to FIG. 5B, at block 1, a user of client 500 initiates performance of a first workload by providing a workload request for the first workload to client 500. The workload request indicates that second deployment 514 is to perform the workload.

At block 2, client 500 identifies, using workload actions 650 that the workload request may be serviced with first resource specific build file or second resource specific build file (e.g., by matching an identifier of the first workload to entry A 652 and using the identifiers 652B). Client 500 then identifies that second deployment has second vendor processor availability. Consequently, using resource specific build file repository 600, client 500 determines that a container instance based on second resource specific build file 620 should be deployed to second deployment 514 (e.g., based on second vendor processor expectation 622B of second resource specific build file 620).

Client 500 then sends instructions to second deployment 514 to deploy a container instance based on the second resource specific build file 620. In response to the instructions, at block 3, second deployment deploys container instance 514A based on the second resource specific build file. By doing so, a higher performance container instance is deployed to second deployment 514 when compared with deploying a container instance based on first or third resource specific build file.

Turning to FIG. 5C, at block 4, the user of client 500 determines that the first workload no longer needs to be performed and that a second workload should be performed, and instructs client 500 accordingly. In response, at block 5, client 500 instructs second deployment 514 to suspend container instance 514A. In response, at block 6, second deployment 514 suspend execution of container instance 514A.

At block 7, client 500 identifies, using workload actions 650 that the workload request may be serviced with only the third resource specific build file (e.g., by matching an identifier of the second workload to entry B 654 and using the identifier 654B). Client 500 then identifies that second deployment does not include graphics processing availability. Consequently, using resource specific build file repository 600, client 500 determines that a critical deficiency is present. In response, client 500 determines that only third deployment 516 includes the graphics processing unit availability necessary to meet the resource expectations of the third resource specific build file. In response, client 500 determines that a container instance based on third resource specific build file 630 should be deployed to third deployment 516.

Client 500 then sends instructions to third deployment 516 to deploy a container instance based on the third resource specific build file 630. In response to the instructions, at block 8, third deployment 516 deploys a container instance based on the third resource specific build file. By doing so, a container instance that will perform the workload in a reasonable amount of time is automatically deployed while the existing container instance for servicing the first workload is suspended.

Figure 5D:
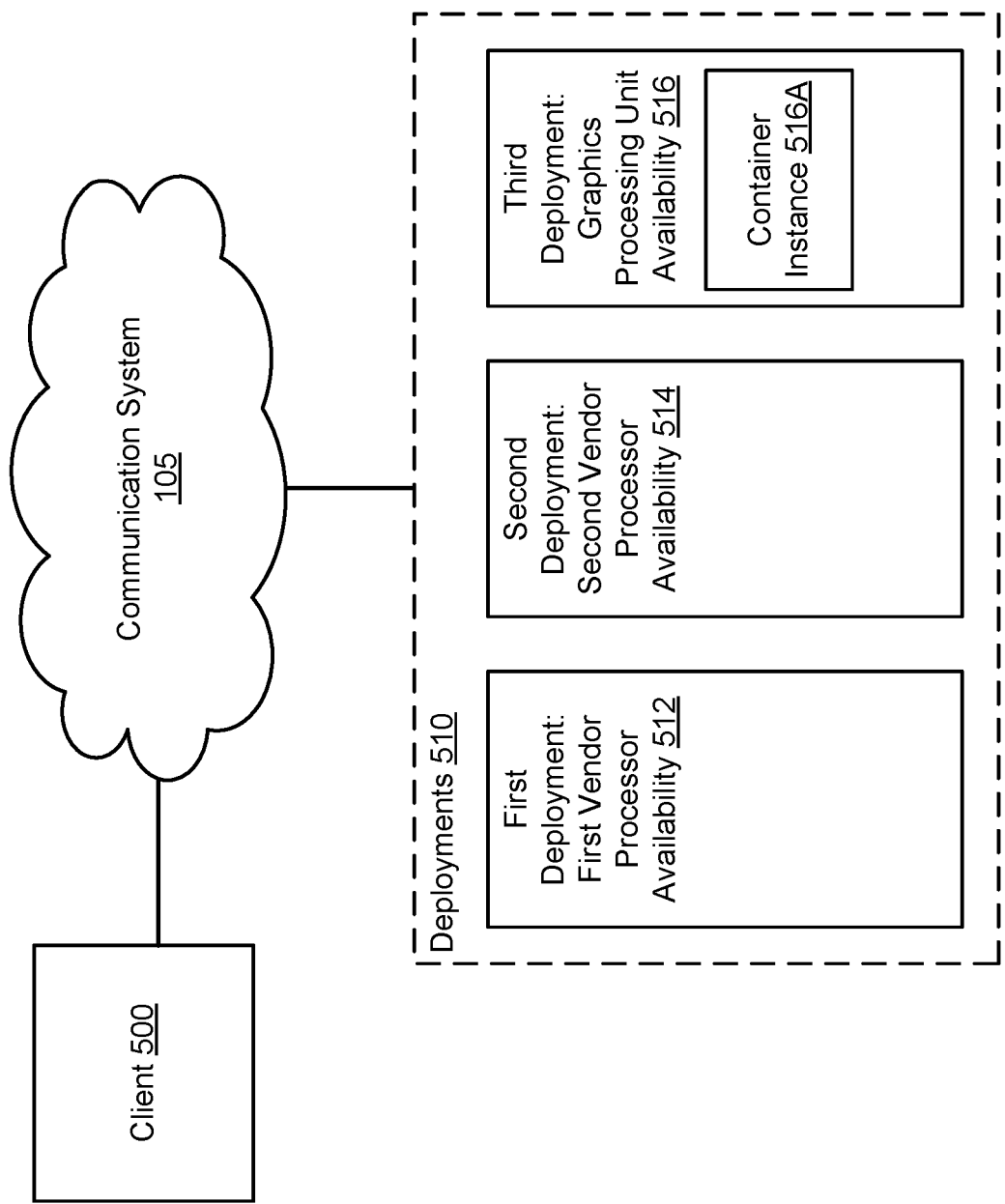

For example, turning to FIG. 5D, only container 516A is present after the changes to second deployment 514 and third deployment 516 are automatically made to service the changing workload requests from the user of client 500.

Figure 7:
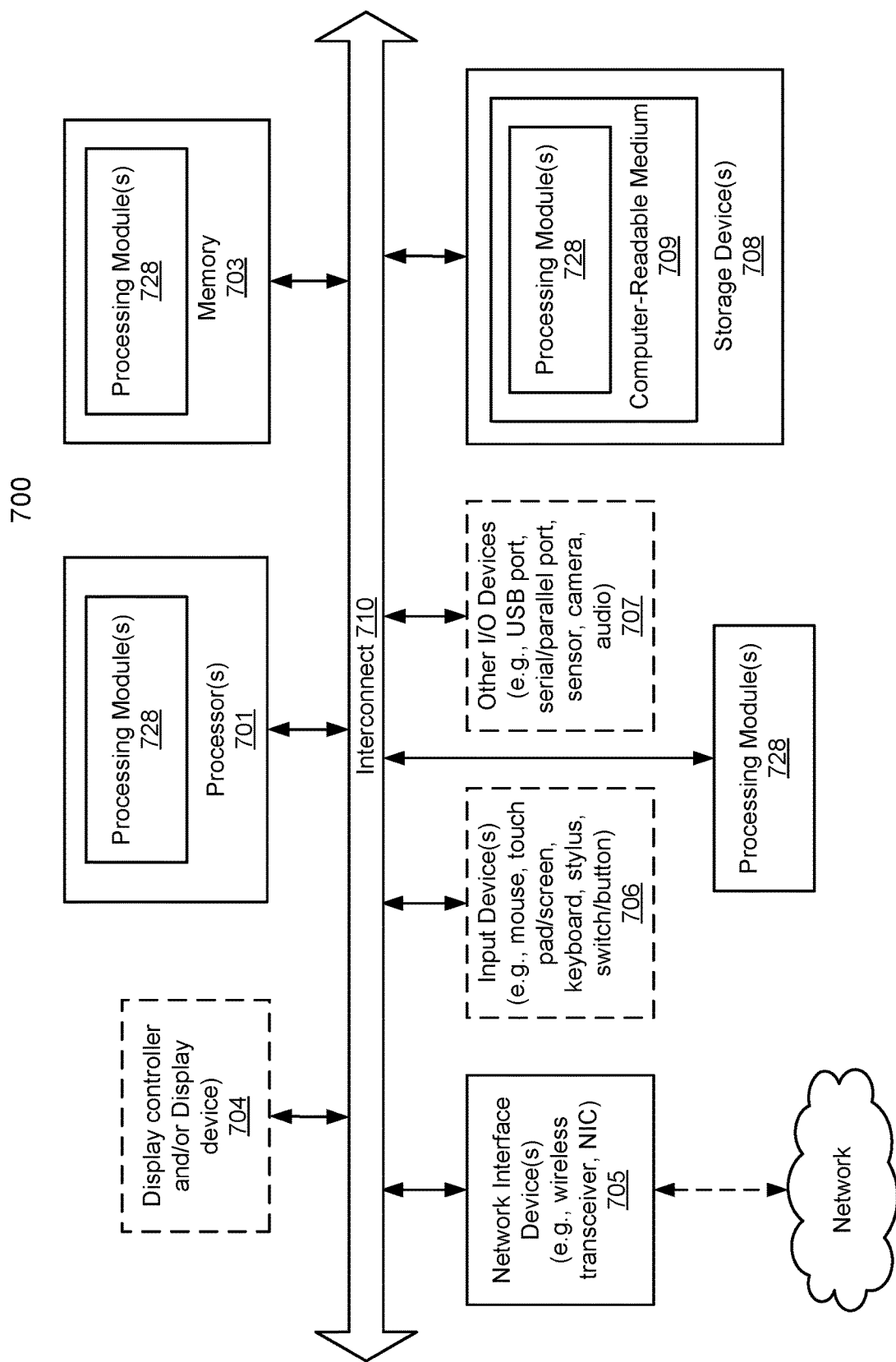
FIG. 7 is a block diagram illustrating a data processing system in accordance with an embodiment.

Any of the components illustrated in FIGS. 1-6B may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OSR/iOS® from Apple, Android® from GoogleR, Linux, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of embodiments disclosed herein as described herein.

In the foregoing specification, embodiments have been described with reference to specific exemplary embodiments thereof. It will be evident that various modifications may be made thereto without departing from the broader spirit and scope of embodiments disclosed herein as set forth in the following claims. The specification and drawings are, accordingly, to be regarded in an illustrative sense rather than a restrictive sense.

What is claimed is:

1. A computer-implemented method for managing workloads, the method comprising:
   obtaining a new workload request for a workload to be performed with a computing device;
   identifying a deployment that will perform the workload to service the new workload request;
   identifying available hardware resources of the deployment for performing the workload;
   after identifying the deployment, selecting one of a plurality of resource specific build files for the workload based on the identified deployment, resources expectations of the one of the plurality of resource specific build files selected for the workload most closely matches the available hardware resources of the deployment; and
   instantiating a container instance associated with the identified one of the plurality of resource specific build files to perform the workload.

2. The computer-implemented method of claim 1, wherein the one of the plurality of resource specific build files comprises:
   a first layer and a second layer; and
   first metadata that specifies a first portion of the resource expectations and second metadata that specifies a second portion of the resource expectations.

3. The computer-implemented method of claim 2, wherein
   the first portion of the resource expectations is based, at least in part, on a hardware dependency of the first layer and the second portion of the resource expectations is based, at least in part, on a hardware dependency of the second layer.

4. The computer-implemented method of claim 2, wherein the first layer defines at least one first action usable to obtain a container used to obtain the container instance and the second layer defines at least one second action usable to obtain the container, the second action depending on performance of the first action prior to the second action.

5. The computer-implemented method of claim 4, wherein the first metadata is embedded with the first layer and the second metadata is embedded with the second layer.

6. The computer-implemented method of claim 2, wherein the one of the plurality of resource specific build files is implemented as a list comprising entries, the first layer and the first metadata being elements of a first entry of the list, the second layer and the second metadata being elements of a second entry of the list, and ordering of the entries of the list defining dependencies between the first layer and the second layer.

7. The computer-implemented method of claim 1, wherein the deployment is selected before any of the plurality of resource specific build files are selected, the one of the plurality of resource specific build files is selected to fit the deployment, and the one of the plurality of resource specific build files is used to generate an image that is then used to instantiate the container instance.

8. The computer-implemented method of claim 1, wherein the workload request comprises information regarding a type of the workload to be performed and an identifier of the deployment that will perform the workload to service the new workload request.

9. The computer-implemented method of claim 1, wherein the one of the plurality of resource specific build files is separate and distinct from an image that is used to create the container instance, the one of the plurality of resource specific build files being used to generate the image and comprises metadata that indicates an expected performance of the container instance to be created using the image.

10. The computer-implemented method of claim 1, wherein the one of the plurality of resource specific build files comprises metadata and is generated by:
obtaining an initial build file without the metadata;
analyzing a container image generated using the initial build file to identify resource expectations of the container image;
generating the metadata based on the resource expectations of the container image; and
embedding the metadata into the initial build file to obtain the one of the plurality of resource specific build files.

11. The computer-implemented method of claim 1, wherein the one of the plurality of resource specific build files comprises metadata comprising authentication data indicating whether the one of the plurality of resource specific build files can be trusted by an entity that selected the one of the plurality of resource specific build files.

12. The computer-implemented method of claim 1, wherein the one of the plurality of resource specific build files comprises one or more layers and embedded metadata, a portion of the one or more layers specify the resources expectations, and only the portion of one or more layers that specify the resources expectations are embedded with the embedded metadata.

13. A non-transitory machine-readable medium having instructions stored therein, which when executed by a processor, cause the processor to perform operations for managing workloads, the operations comprising:
obtaining a new workload request for a workload to be performed with a computing device;
identifying a deployment that will perform the workload to service the new workload request;
identifying available hardware resources of the deployment for performing the workload;
after identifying the deployment, selecting one of a plurality of resource specific build files for the workload based on the identified deployment, resources expectations of the one of the plurality of resource specific build files selected for the workload most closely matches the available hardware resources of the deployment; and
instantiating a container instance associated with the identified one of the plurality of resource specific build files to perform the workload.

14. The non-transitory machine-readable medium of claim 13, wherein the one of the plurality of resource specific build files comprises:
a first layer; and
first metadata that specifies a first portion of the resource expectations, the first portion of the resource expectations being based, at least in part, on a hardware dependency of the first layer.

15. The non-transitory machine-readable medium of claim 14, wherein the one of the plurality of resource specific build files further comprises:
a second layer; and
second metadata that specifies a second portion of the resource expectations, the second portion of the resource expectations being based, at least in part, on a hardware dependency of the second layer.

16. The non-transitory machine-readable medium of claim 15, wherein the first layer defines at least one first action usable to obtain a container used to obtain the container instance and the second layer defines at least one second action usable to obtain the container, the second action depending on performance of the first action prior to the second action.

17. The non-transitory machine-readable medium of claim 15, wherein the first metadata is embedded with the first layer and the second metadata is embedded with the second layer.

18. A data processing device, comprising:
a processor; and
a memory coupled to the processor to store instructions, which when executed by the processor, cause the processor to perform operations for managing workloads, the operations comprising:
obtaining a new workload request for a workload to be performed with a computing device;
identifying a deployment that will perform the workload to service the new workload request;
identifying available hardware resources of the deployment for performing the workload;
after identifying the deployment, selecting one of a plurality of resource specific build files for the workload based on the identified deployment, resources expectations of the one of the plurality of resource specific build files selected for the workload most closely matches the available hardware resources of the deployment; and
instantiating a container instance associated with the identified one of the plurality of resource specific build files to perform the workload.

19. The data processing device of claim 18, wherein the one of the plurality of resource specific build files comprises:
a first layer; and
first metadata that specifies a first portion of the resource expectations, the first portion of the resource expectations being based, at least in part, on a hardware dependency of the first layer.

20. The data processing device of claim 19, wherein the one of the plurality of resource specific build files further comprises:
a second layer; and
second metadata that specifies a second portion of the resource expectations, the second portion of the resource expectations being based, at least in part, on a hardware dependency of the second layer.

* * * * *